United States Patent
Chiang et al.

(10) Patent No.: US 10,206,549 B2
(45) Date of Patent: Feb. 19, 2019

(54) CLEANING MACHINE

(71) Applicant: HON HAI PRECISION INDUSTRY CO., LTD., New Taipei (TW)

(72) Inventors: Hsieh-Chih Chiang, Tu-Cheng (TW); Hsieh-Tung Chung, Tu-Cheng (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 94 days.

(21) Appl. No.: 15/590,152

(22) Filed: May 9, 2017

(65) Prior Publication Data

US 2018/0110386 A1 Apr. 26, 2018

(30) Foreign Application Priority Data

Oct. 20, 2016 (CN) .................... 2016 2 1146943 U

(51) Int. Cl.
*A47L 9/28* (2006.01)
*A47L 9/04* (2006.01)
*G05D 1/00* (2006.01)

(52) U.S. Cl.
CPC .............. *A47L 9/28* (2013.01); *A47L 9/0477* (2013.01); *A47L 9/2852* (2013.01); *A47L 9/2873* (2013.01); *G05D 1/00* (2013.01); *A47L 9/2805* (2013.01); *A47L 2201/00* (2013.01); *A47L 2201/04* (2013.01); *A47L 2201/06* (2013.01)

(58) Field of Classification Search
CPC ........ A47L 8/28; A47L 9/0477; A47L 9/2873; A47L 9/2805; A47L 2201/00; A47L 2201/04; A47L 2201/06; G05D 1/00
See application file for complete search history.

(56) References Cited

U.S. PATENT DOCUMENTS

| 2016/0101525 A1* | 4/2016 | Plachetka | A47L 11/33 15/319 |
| 2017/0269212 A1* | 9/2017 | Strang | G05D 1/024 |
| 2018/0095472 A1* | 4/2018 | Windorfer | A47L 11/4008 |

* cited by examiner

*Primary Examiner* — Dung Van Nguyen
(74) *Attorney, Agent, or Firm* — ScienBiziP, P.C.

(57) ABSTRACT

A cleaning machine includes a body having a first surface and a second surface opposite to the first surface, a laser module mounted on the first surface of the body and having a transmitting terminal and a receiving terminal, a rotary table mounted on the first surface of the body and rotating about the laser module. Further comprising a reflecting portion connected with the rotary table, the reflecting portion along with the rotary table rotates collectively about the laser module. The transmitting terminal of the laser module emits a light signal, the reflecting portion reflects the light signal out of the body, the receiving terminal receives the light signal reflected by an obstacle.

11 Claims, 1 Drawing Sheet

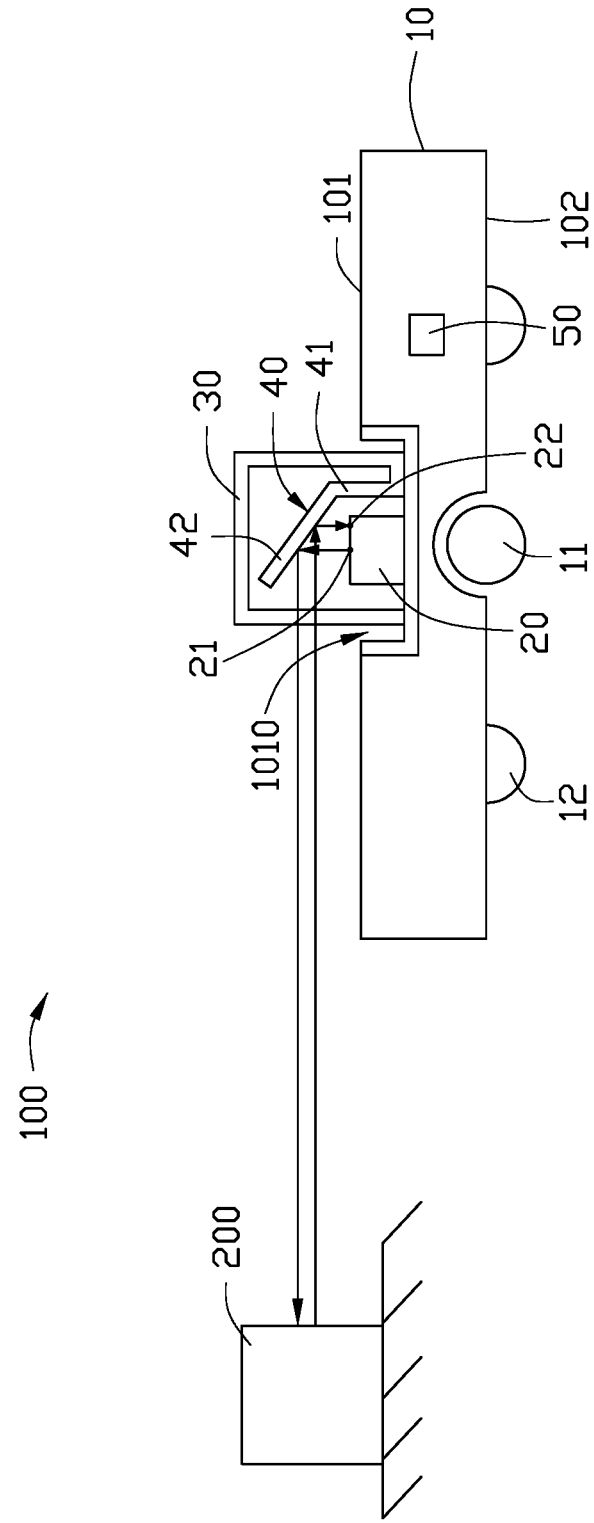

CLEANING MACHINE

CROSS-REFERENCE TO RELATED APPLICATIONS

This application claims priority to Chinese Patent Application No. 201621146943.6 filed on Oct. 20, 2016, the contents of which are incorporated by reference herein.

FIELD

The subject matter herein generally relates to a cleaning machine.

BACKGROUND

A cleaning machine is widely used to clean a home.

As the domestic living standards continue to improve, the cleaning machine is more and more popular and necessary. The cleaning machine can develop knowledge regarding the cleaning environment from an intermediate to a higher level.

Usually, the cleaning machine has a dust chamber. An intelligent chip is mounted within the dust chamber of the cleaning machine. The intelligent chip can calculate a room size and an obstacle area to automatically choose a cleaning route for the cleaning machine. Further, the cleaning machine also mounts at least one sensor thereon to detect or identify obstacles and then to slow down to prevent collisions. However, most of the cleaning machine has a complex structure and high costs that can affect the further popularization of the cleaning machine.

BRIEF DESCRIPTION OF THE DRAWINGS

Implementations of the present technology will now be described, by way of example only, with reference to the attached figures.

FIG. 1 is a diagram of a cleaning machine of the present disclosure.

DETAILED DESCRIPTION OF EXEMPLARY EMBODIMENTS

It will be appreciated that for simplicity and clarity of illustration, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures and components have not been described in detail so as not to obscure the related relevant feature being described. Also, the description is not to be considered as limiting the scope of the exemplary embodiments described herein. The drawings are not necessarily to scale and the proportions of certain parts have been exaggerated to better illustrate details and features of the present disclosure. The description is not to be considered as limiting the scope of the exemplary embodiments described herein.

Several definitions that apply throughout this disclosure will now be presented. The term "comprising" means "including, but not necessarily limited to"; it specifically indicates open-ended inclusion or membership in a so-described combination, group, series and the like. The term "coupled" is defined as connected, whether directly or indirectly through intervening components, and is not necessarily limited to physical connections. The connection can be such that the objects are permanently connected or releasably connected.

As illustrated in FIG. 1, a cleaning machine 100 includes a body 10, a laser module 20, a rotary table 30 and a reflecting portion 40 mounted on the body 10.

The body 10 has a first surface 101 and a second surface 102 opposite to the first surface 101. The body 10 forms a groove 1010 that extends from the first surface 101 to the second surface 102. A cleaning device 12 and walking device 11 are mounted on the second surface 102 of the body 10.

A main portion of the cleaning device 12 is mounted in the body 10. The cleaning device 12 may have a cleaning brush and a nozzle (not shown in FIG. 1). The cleaning brush and the nozzle have portion exposed from the body 10. The cleaning brush of the cleaning device 12 is used for cleaning the floor of a room, and the nozzle of the cleaning 12 is used for assimilating dust and rubbish vacuuming into the main portion of the cleaning device 12.

The walking device 11 has wheels and a drive (not shown in FIG. 1). The drive of the walking device 11 drives the wheels to move.

The laser module 20 mounts on a bottom surface of the groove 1010. The laser module 20 has a transmitting terminal 21 and a receiving terminal 22. The transmitting terminal 21 of the laser module 20 emits a light signal out of the body 10. The receiving terminal 22 of the laser module 20 receives the light signal reflected by an obstacle 200 in a propagating path of the light signal.

The rotary table 30 is also mounted on the bottom surface of the groove 1010. The rotary table 30 can rotate around laser module 20. In the illustrated exemplary embodiment, the rotary table 30 can continuously rotate 360 degrees around the laser module 20.

The reflecting portion 40 includes at least one reflector for reflecting the light signal emitted from the transmitting terminal 21 of the laser module 20, and the light signal reflected by the obstacle 200.

In the illustrated exemplary embodiment, the reflecting portion 40 includes a first reflector 41 and a second reflector 42 configured to an angle with respect to the first reflector 41. An end of the first reflector 41 connects with the rotary table 30, and another end of the first reflector 41 connects with the second reflector 42. The reflecting portion 40 rotates along with the rotary table 30 about the laser module 20.

Further, the cleaning machine 100 may also include a control unit 50 electrically coupled with the cleaning device 12, the walking device 11 and the laser module 20. The control unit 50 may control the laser module to emit laser. The control unit 50 may control a rotation frequency of the rotary table 30. The control unit 50 also can calculate a distance between the sweep floor machine and the obstacle 200 according to the time interval between the signals from the transmitting terminal 21 and the receiving terminal 22. Then the control unit 50 calculates a room size and an obstacle area to automatically choose a clean route for the cleaning machine.

While the cleaning machine 100 is operating, the transmitting terminal 21 of the laser module 20 emits a light signal toward the second reflector 42 of the reflecting portion 40. The second reflector 42 reflects the light signal out of the body 10 along a first direction. After the light signal is incident upon the obstacle 200, the light signal is reflected by the obstacle 200 towards the reflecting portion 40 on a direction parallel but opposite to the first direction, then, the reflecting portion 40 reflects the light signal to the receiving terminal 22 of the laser module 20. Because the rotary table 30 rotates 360 degrees around the laser module 20 in one rotation, the cleaning machine can detect the obstacle 200 all around the body 10.

In the illustrated embodiment, the laser module 20 connects with the body 10. The rotary table 30 and the reflecting portion 40 mounts on the body 10 to rotate 360 degrees around the laser module 20. Thus, the cleaning machine can detect the obstacle 200 at 360 degrees. The rotary table 30, the reflecting portion 40 and the laser module 20 have simple structures and are low costs, therefore, the cleaning machine is a low cost and has potential market competitiveness.

The exemplary embodiments shown and described above are only examples. Many details are often found in the art such as the other features of a cleaning machine. Therefore, many such details are neither shown nor described. Even though numerous characteristics and advantages of the present technology have been set forth in the foregoing description, together with details of the structure and function of the present disclosure, the disclosure is illustrative only, and changes can be made in the detail, including in matters of shape, size and arrangement of the parts within the principles of the present disclosure up to, and including the full extent established by the broad general meaning of the terms used in the claims. It will therefore be appreciated that the embodiments described above can be modified within the scope of the claims.

What is claimed is:

1. A cleaning machine, comprising:
   a body having a first surface and a second surface opposite to the first surface;
   a laser module mounted on the first surface of the body and having a transmitting terminal and a receiving terminal;
   a rotary table mounted on the first surface of the body and rotating about the laser module;
   wherein further comprising a reflecting portion connected with the rotary table, the reflecting portion along with the rotary table rotate collectively about the laser module, the transmitting terminal of the laser module emits a light signal, the reflecting portion reflects the light signal to out of the body, the receiving terminal receives the light signal reflected by an obstacle in a path of the propagated light signal.

2. The cleaning machine of claim 1, wherein the body forms a groove that extends from the first surface towards the second surface, the laser module is mounted on a bottom surface of the groove, the rotary table is mounted on the bottom surface of the groove and rotates about the laser module.

3. The cleaning machine of claim 1, wherein the rotary table continuously rotates 360 degrees about the laser module.

4. The cleaning machine of claim 1, wherein the second surface of the body comprises a cleaning device and walking device mounted thereon.

5. The cleaning machine of claim 4, wherein the cleaning device has a cleaning brush and a nozzle, the cleaning brush and the nozzle have portion exposed from the body.

6. The cleaning machine of claim 4, wherein the walking device has wheels and a drive, the drive of the walking device drives the wheels to move.

7. The cleaning machine of claim 1, wherein the reflecting portion comprises at least one reflector for reflecting the light signal emitted from the transmitting terminal of the laser module and the light signal reflected by the obstacle.

8. The cleaning machine of claim 7, wherein the reflecting portion comprises a first reflector and a second reflector configured to an angle with respect to the first reflector, an end of the first reflector connects with the rotary table, and another end of the first reflector connects with the second reflector.

9. The cleaning machine of claim 1, wherein further comprises a control unit, the control unit is electrically coupled with the laser module and the rotary table.

10. The cleaning machine of claim 9, wherein the control unit controls the laser module to emit laser and a rotation frequency of the rotary table, the control unit calculates a distance between the sweep floor machine and the obstacle according to the time interval between the signals from the transmitting terminal and the receiving terminal.

11. The cleaning machine of claim 1, wherein the transmitting terminal of the laser module emits a light signal toward the second reflector of the reflecting portion, the second reflector reflects the light signal out of the body along a first direction, after the light signal is incident upon the obstacle, the light signal is reflected by the obstacle towards the reflecting portion on a direction parallel but opposite to the first direction, then the reflecting portion reflects the light signal to the receiving terminal of the laser module.

* * * * *